No. 627,382. Patented June 20, 1899.
G. B. BIRRELL.
POWER TRANSMITTING MECHANISM.
(Application filed Feb. 21, 1896. Renewed Nov. 25, 1898.)
(No Model.) 2 Sheets—Sheet 2.
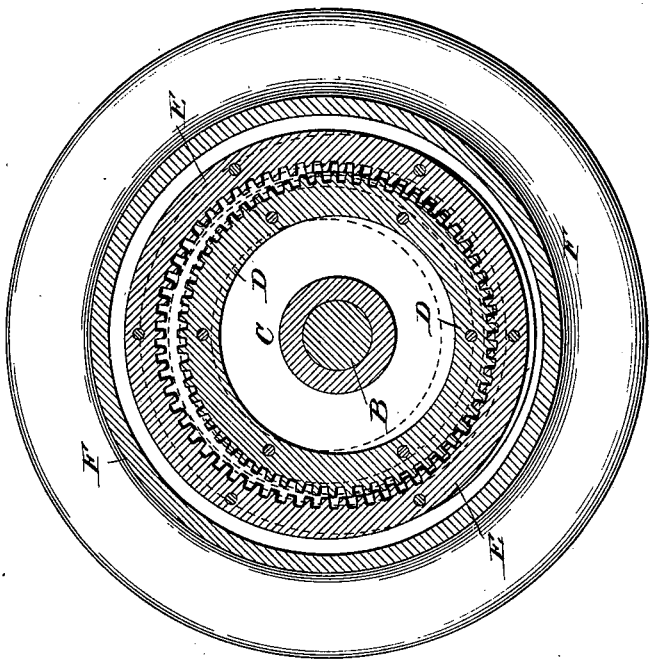
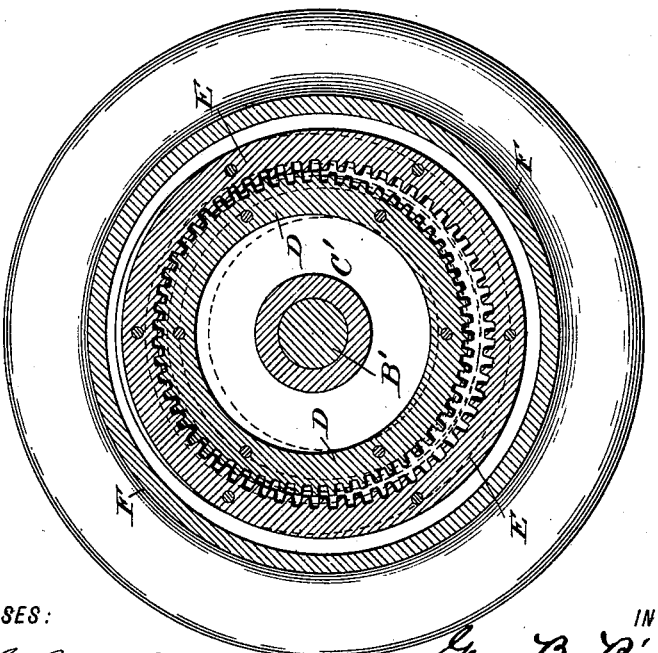
WITNESSES:
INVENTOR
Geo. B. Birrell
BY
ATTORNEY.

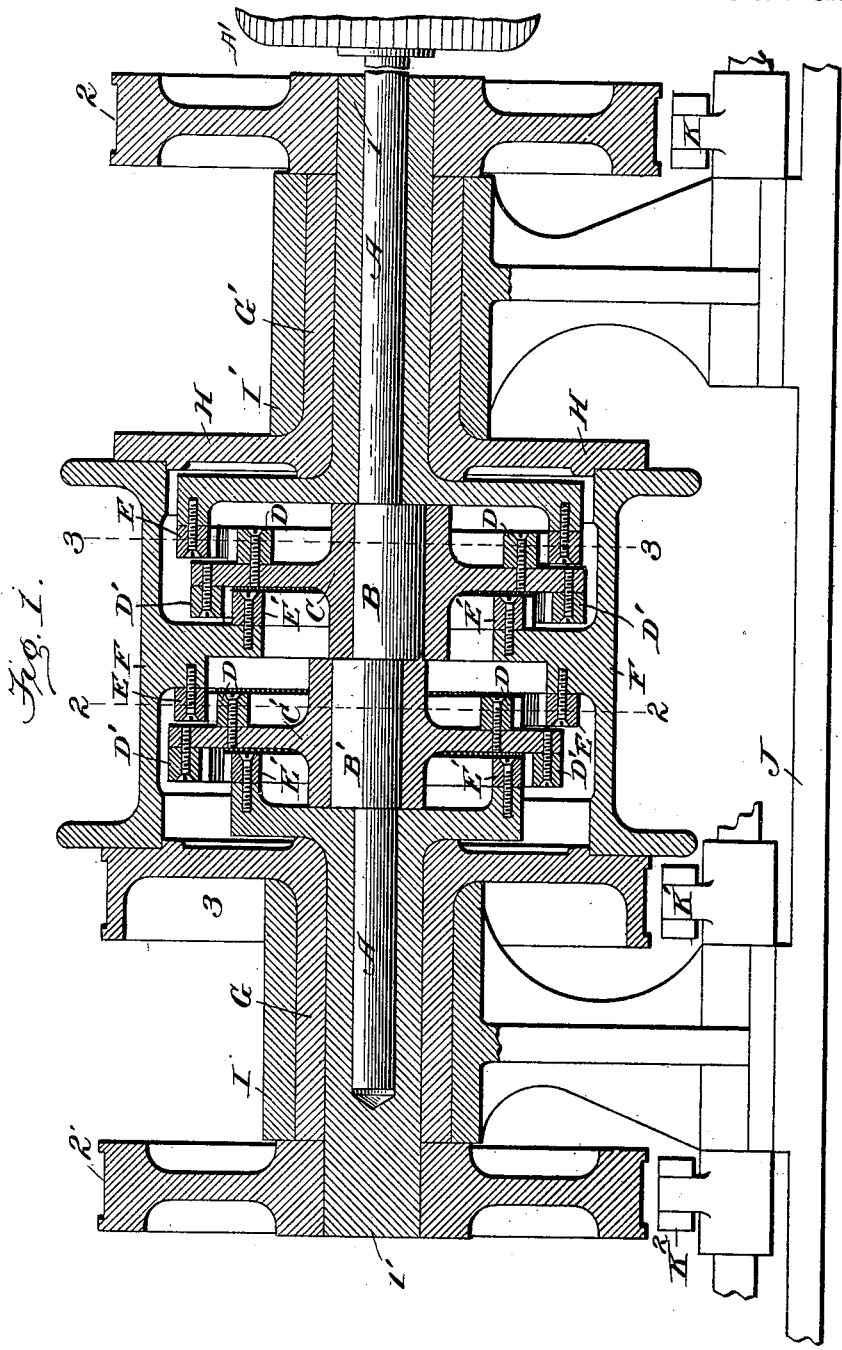

UNITED STATES PATENT OFFICE.

GEORGE B. BIRRELL, OF NEW YORK, N. Y., ASSIGNOR, BY MESNE ASSIGN-
MENTS, TO THE BIRRELL UNIVERSAL TRANSMITTER COMPANY, OF NEW
YORK.

POWER-TRANSMITTING MECHANISM.

SPECIFICATION forming part of Letters Patent No. 627,382, dated June 20, 1899.

Application filed February 21, 1896. Renewed November 25, 1898. Serial No. 697,467. (No model.)

*To all whom it may concern:*

Be it known that I, GEORGE B. BIRRELL, a citizen of the United States, residing at New York, in the county of New York and State of New York, have invented certain new and useful Improvements in Power-Transmitting Mechanism; and I do hereby declare the following to be a full, clear, and exact description of the invention, such as will enable others skilled in the art to which it appertains to make and use the same.

My invention relates to certain new and useful improvements in power-transmitting mechanism, and more particularly to that class of devices which involve the use of differential gearing.

It has for its objects to provide such construction, combination, and arrangement of mechanical devices as will secure reduction of speed and increase of torque in equal proportions from prime movers—such as electric motors, steam-engines, &c.—permitting at the same time the reversal of the last mover of the mechanism without reversing the prime mover, and to also establish a perfect balance or equilibrium of the mechanism without the aid of any extraneous balancing mechanism *per se;* and with these ends in view my invention consists in the employment of two sets of differential gears secured to disks running loosely on but driven by two eccentrics of equal throw, the throw of said eccentrics being diametrically opposite to each other and combining with said arrangement of devices a suitable prime mover and last mover, all as will be hereinafter and in detail explained.

I have found from experience that where one set of differential gears are used it is impossible to balance the same by the aid of an ordinary counterbalance, for the reason that although the action of the eccentric engages all the teeth of the gears fastened on the disk with the teeth of the gears with which they engage at each revolution of the eccentric, the advancement of the periphery of this disk is only a small proportion of its circumference, while the counterbalance, being attached to the eccentric-shaft and necessarily running synchronously with the shaft, generates centrifugal force in proportion to its velocity and its weight at its center of gyration, and the disk naturally generates through its action a very slight amount of centrifugal force, and hence a true balance is impossible to effect, and with the further disadvantageous result of necessarily heating the eccentric-shaft bearings and a consequent loss of alinement from this cause. In other words, if under the conditions involved in the use of a single set of gears and the ordinary balance a true balance is secured by accident at a given rate of speed such balance will necessarily be destroyed upon any change of speed of the prime mover which may become necessary. It is a well-known fact that in reversing an electric motor having to regenerate at each reversal its counter electromotive force and overcome the inertia of its armature and commutator is a most wasteful condition, and the same is true also where the service of a steam-engine or water-wheel is employed as a prime mover in overcoming their inertia and regenerating centrifugal force on each reversal. Not only do such constructions involving such action become wasteful of generated power, but it will be readily seen that it also involves waste in time as well, and also that it becomes difficult, if not impossible, to make delicate or sensitive movements, such as are essentially desirable in many instances, such as the raising and lowering of elevators, the rotation of ship's turrets, and the raising, lowering, and sighting of heavy guns. It being a recognized fact that in the employment of one set of gears it becomes absolutely necessary to bring the prime mover to a static condition before reversal can take place, it follows that whenever celerity of action is imperative the use of a single set of gears would be impossible.

My invention is designed to overcome all of the enumerated disadvantages incident to the use of a single set of gears and to provide means by which the power and motion of a prime mover may be economically and quickly transmitted to the object to be moved or operated upon.

In order that those familiar with the art to which my invention relates may fully understand the same, I will proceed to describe the construction, arrangement, and operation of the several parts, referring by letters and figures to the accompanying drawings, in which—

Figure 1 represents a longitudinal central section of an apparatus designed to operate an ordinary elevator; Fig. 2, a transverse section on the line 2 2 of Fig. 1, and Fig. 3 a similar section on the line 3 3 of Fig. 1.

In the drawings I have shown an apparatus, as before stated, designed to operate an ordinary elevator; but it will be readily understood that I do not wish to confine myself to such construction, for in lieu of the drum shown, and to which the power and motion are imparted by my improved system of gears and brakes, any other device intermediate of the system of gears and the object to be operated upon may be employed by the exercise of ordinary mechanical skill.

A' represents an ordinary electric motor.

A is the first mover or shaft, having secured thereon two eccentrics B B' of equal diameter and throw and so adjusted upon the shafts that their respective throws will be diametrically opposite to each other. On B B' are loosely mounted two compound gears C and C', which are respectively driven by said eccentrics. On each of the compound gears C and C' are secured external and internal gear-rings D D'. External gear D on compound gear C engages with an internal gear E, secured to a flange on a shaft 1, to the outer end of which shaft is secured a brake-wheel 2. Internal gear D' on this same disk C engages with an external gear E', which is attached to the elevator-drum F, as clearly shown. The external gear D on the second compound gear C' engages with internal gear E, which is also secured to the elevator-drum F, as clearly shown. The internal gear D' on second compound gear C' engages with external gear E', secured to a flange on shaft 1', to the outer end of which is secured a brake-wheel 2'.

To the drum F is secured a brake-wheel 3, which is extended to form a journal G. On the opposite side of drum F is secured a flange H, which is extended to form a journal G'. The brake-wheel 3 and the flange H constitute bonnets to retain the oil with which the drum F is partially filled for the purpose of lubrication. The journals G and G' are mounted within boxes I and I', and these boxes and journals necessarily sustain the pressure of the load imposed upon the drum F. The boxes I and I', as clearly shown, are erected upon an ordinary bed-plate or support J, which renders the entire structure compact and self-contained and retains the necessary alinement.

K, K', and K² are intended to illustrate any suitable brake mechanism for braking the wheels 2, 3, and 2' and need no further description or illustration, as it is obvious that any class of brakes actuated by electricity, hand, or other power may be employed.

Now, having described the construction and arrangement of the several parts shown in the drawings, I will proceed to describe the action and results, assuming that, as illustrated, the mechanism is employed to operate an ordinary elevator.

The initial power being applied to shaft A and transmitted through eccentrics B and B' to the disks C and C' and their respective gears, if pressure is applied through brake K to brake-wheel 2 the elevator-drum F revolves and raises the load to any altitude, where it may be halted and held by first releasing brake K and applying the brake K' to brake-wheel 3. To lower the load, first release brake K' and apply brake K² to brake-wheel 2'. This raising, halting, and lowering of the load, it will be seen, can be accomplished while the prime mover is running in one direction and without being stopped or reversed.

I have explained generally that with the prime mover rotating in one direction the load carried by the drum may be raised, halted, and lowered, and I will now fully explain the conditions which effectuate these results. First, it must be kept in mind that the compound gears C and C' are as nearly duplicates or facsimiles in every particular as they can be made by mechanical skill, and the gears secured thereto are similarly made duplicates or facsimiles. This construction I prefer for the reason that the results of effecting a perfect balance of such construction are absolutely definite and can be predetermined with accuracy. It will be understood, however, that by the exercise of high mechanical skill a similar result can be produced by the service of two external gears being attached to one of the compound gears meshing with two internal gears respectively attached to the last mover and brake mechanism, the other compound gear having attached to it two internal gears meshing with two external gears respectively attached to the last mover and brake mechanism. It will be apparent that in constructing a mechanism embodying the preferred gear arrangement if the eccentric-shaft is made having its eccentrics of equal diameter and length of eccentric face and of equal throw and their throws set diametrically opposite to each other perfect equipoise is established, and if the two compound gears, with their gears attached, are made duplicates of each other their exact duplication can be demonstrated by weighing them, and in the combination of the eccentrics and compound gears made as described a perfect balance will be the result, a most potent factor when the prime mover has a high speed of rotation. I therefore wish it to be distinctly understood that the claims hereinafter made by me are intended to comprehend the above modification, as well as the preferred construction. The gears with which the disk gears engage are also duplicates.

To illustrate the reductive action of these differential gears and also to show how the drum F is revolved in opposite directions and, further, to clearly explain the action of the eccentrics, I will assume the following diameters and numbers of teeth of the gears which govern the throw of the eccentrics. I assume that internal gear E, which is secured to flange of shaft 1, has one hundred (100) teeth, and external gear D, which is secured to compound gear C, has ninety (90) teeth, internal gear D', secured to compound gear C, has one hundred (100) teeth, and external gear E', attached to drum F, has ninety (90) teeth. Now if brake K be applied to the brake-wheel 2 and shaft A be revolved and the eccentric B make one revolution all of the teeth of gear D will have engaged in the teeth of gear E, with the result that D has moved in a direction opposite the prime mover and to a distance equal to ten (10) teeth, or, having ninety (90) teeth, has moved a distance equal to one-ninth ($\frac{1}{9}$) of its periphery. Internal gear D', which is also secured to compound gear C, must necessarily have moved one-ninth ($\frac{1}{9}$) of its periphery, or eleven and one-ninth ($11\frac{1}{9}$) teeth, the mathematical result being that the ten teeth which gear D has moved, added to the eleven and one-ninth ($11\frac{1}{9}$) teeth which gear D' has moved, divided into ninety, which is the number of teeth in gear E', gives the reduction in proportion of revolution which the drum F has moved in a direction opposite to the prime mover A. Now if brake K be released and brake K² be applied to brake-wheel 2' and shaft A be revolved and the eccentric B' make one revolution the internal gear D', secured to compound gear C', will have engaged all of its teeth with the teeth of E' and have advanced in the same direction as the prime mover A and to a distance equal to ten teeth or one-tenth of its periphery, external gear D, which is also secured to disk C', must necessarily have advanced one-tenth of its periphery or nine teeth, the mathematical result being that the ten teeth which gear D' has advanced added to the nine teeth which gear D has advanced divided into one hundred, which is the number of teeth in gear E, gives the reduction in proportion of revolution which the drum F has moved in the same direction as the prime mover A. Assuming that all of the gears referred to have teeth of No. 10 diametrical pitch, the diameters of the internal gears would be ten inches and the diameters of the external gears would be nine inches, which would require the throw of the two eccentrics B and B' to be one-half inch exact in order to make the mechanism operate satisfactorily.

At this point I desire to lay particular stress upon the fact, which is a most important one, that when the drum is moving in the same direction as the prime mover A it, in fact, acts as an aid to such movement of said prime mover. For instance, in the illustration given if the load is being raised by the action of the gears on C and lowered by the action of the gears on C' at the time of lowering the load is practically driving the prime mover, and to make this important fact still more clear if the prime mover were an electric motor it would be converted into a generator and the current created would be driven back through the conducting-wires.

It will be apparent that if it is necessary to impose a pressure of one hundred pounds on brake-wheel 2 to hold it stationary and impart to drum F the full speed of the transmitting mechanism which operates it if the pressure on brake-wheel 2 is reduced and it is permitted to revolve to a greater or less degree the drum F will be proportionately reduced in travel, which action when raising or lowering elevator-cages, revolving turrets, or elevating and depressing heavy guns becomes highly important and desirable, as through such action great precision and accuracy is secured.

As before stated, I do not wish to be confined to the use of a drum operated by the disk gearing and eccentrics, but may apply the several motions and speeds or reductions and accelerations of speeds to other devices than a drum, and thus render available the genus of my particular combination of gearing for any purpose to which it may be desirable to apply the same.

In order that the scope and importance of the construction involved in my invention may be fully appreciated and due force given to the claims hereinafter made, I desire to call attention to the fact, which at present I believe to be true—namely, that I am the first to so construct and organize a differential gearing and motor that while the prime mover shall run continuously in one direction the load or other device to be controlled or moved may be caused to move in the same or the reverse direction to that of the prime mover or halted and started at will, thus securing at all times positive, sensitive, and accurate movements or adjustments, while at the same time all of the moving parts shall work in perfect equipoise.

It will be apparent that in place of using F as a last mover it may be made stationary, and thereupon the brake-wheels 2 and 2' would become last movers, each running in opposite directions, while the prime mover revolves constantly in one direction.

Having described the construction and operation of my improved mechanism, what I claim as new, and desire to secure by Letters Patent, is—

1. In a power-transmitting mechanism a drive-shaft A, eccentrics B, B' thereon, the compound gears C, C', mounted on said eccentrics, and each compound gear comprising the internal gear D' and the external gear D, the last mover F, the internal gear E and external gear E' carried by the said last mover, the external gear E', the brake mechanism 2' attached to said gear, the internal gear E and the brake mechanism 2 attached to said gear, substantially as and for the purposes set forth.

2. In combination with a suitable motor and its driving-shaft, two eccentrics B, B' thereon, the compound gears C, C' mounted on said eccentrics, and each compound gear comprising the internal gear D' and the external gear D, the last mover F, the internal gear E and external gear E' carried by the said last mover, the external gear E', the brake mechanism 2' attached to said gear, the internal gear E and the brake mechanism 2 attached to said gear, substantially as and for the purposes set forth.

3. In combination with the driving-shaft A, mounted in boxes G, G', and provided with eccentrics B, B', and the disks C, C' provided with external and internal gears D, D', the drum F, provided with internal and external gears E, E', brake-wheels 2, 3 and 2', and corresponding brake-bands K, K' and K², substantially as and for the purposes described.

4. In a power-transmitting mechanism, the combination of a prime mover arranged to be rotated continuously in one direction and carrying two oppositely-set eccentrics, compound gears journaled on said eccentrics, respectively, a last mover carrying gears respectively engaged with certain members of said compound gears, and brake or fulcrum gears engaged respectively with the other members of the compound gears, the arrangement of gearing being such that the last mover is driven in one direction when one brake or fulcrum gear is held and in the opposite direction when the other brake or fulcrum gear is held and such that equipoise obtains at all times by reason of the relation the parts through which motion is transmitted in one direction have to the parts through which motion is transmitted in the opposite direction.

In testimony whereof I affix my signature in presence of two witnesses.

GEORGE B. BIRRELL.

Witnesses:
WM. C. McINTIRE,
N. CURTIS LAMMOND.